Patented Feb. 12, 1952

2,585,341

UNITED STATES PATENT OFFICE 2,585,341

METHOD OF MAKING COMPOSITIONS OF TIN OXIDE

John M. Mochel, Oak Ridge, Tenn., assignor to Corning Glass Works, Corning, N. Y., a corporation of New York No Drawing. Application January 12, 1948, Serial No. 1,891

1 Claim. (Cl. 106—65)

This invention relates to the production of stannic oxide and mixtures or compositions containing a high percentage of stannic oxide. In my pending application Serial Number 644,956, filed February 1, 1946, now Patent No. 2,490,825, issued December 13, 1949, I have disclosed and claimed electrically conducting sintered refractory bodies comprising stannic oxide, containing 0.5% to 5% of an activating oxide for increasing the electrical conductivity of the stannic oxide comprising an oxide of arsenic, antimony, or bismuth, and 0.5% to 2% of a mineralizing agent to promote recrystallization and shrinkage of the stannic oxide when fired. Mineralizing agents which are effective with stannic oxide are well known, see Patent 2,244,777, issued June 10, 1941, to Harrison P. Hood, and include oxides of copper, silver, gold, manganese, iron, cobalt, and nickel. Such refractory bodies of stannic oxide are made preferably by slip casting a mixture of the ingredients into the desired shapes and firing the shaped bodies at the sintering temperature. Slip casting requires that the mixture be in a finely divided crystalline state and that it form a properly deflocculated slip. Commercial stannic oxide made by prior methods does not always meet these requirements.

The primary object of this invention is to produce more advantageously the refractory bodies described in my pending application which is mentioned above.

Another object is to produce a finely crystalline stannic oxide which can be slip cast.

Another object is to produce a finely divided intimate mixture of crystalline stannic oxide and a mineralizing agent.

A further object is to produce a finely divided intimate mixture of crystalline stannic oxide, mineralizing agent and an oxide for activating the electrical conductivity, with uniform composition and slip-casting qualities.

Still another object is to co-precipitate metastannic acid with an activating oxide to form a finely crystalline, easily filtrable mixture.

In its broadest aspect the invention comprises the method which includes reacting ammonia with a boiling aqueous solution of stannic chloride ($SnCl_4$) while maintaining the pH of the reaction mixture below 7 but above 4 to precipitate metastannic acid, introducing into the metastannic acid a small amount of a mineralizing agent, preferably CuO, in proportions equivalent to about 0.5 to 2 parts by weight per 100 parts by weight of $SnO_2$, separating, drying, and calcining the mixture at a temperature in the neighborhood of 1200° to 1400° C. to convert the metastannic acid to $SnO_2$.

More specifically the invention additionally includes the introduction into the precipitate of about 1 to 5 parts by weight of an activating oxide consisting of an oxide of arsenic, antimony, or bismuth per 100 parts of $SnO_2$, either before or after the precipitation of the metastannic acid. Preferably the activating oxide is $Sb_2O_3$.

For carrying out the reaction the principal reagents are an aqueous solution of stannic chloride and either concentrated ammonium hydroxide or gaseous ammonia. The latter is to be preferred because of economy and ease of handling.

The reaction preferably is started with the presence in the reaction vessel of some water or a small portion of the reaction mixture of a previous run because the pH of the contents of the reaction vessel is more easily controlled at the start of a run if a substantial volume of liquid of the desired pH is present. I have found that for best results the pH of the reaction mixture should be maintained below 7 but above 4, and preferably at about 5. The reaction proceeds to the best advantage at a temperature at or near the boiling point of the reaction mixture, and after the reaction is started sufficient heat is thereby generated to maintain the reaction mixture at the proper temperature.

In order to control the pH of the reaction mixture, the reagents must be introduced simultaneously and continuously and the flow of at least one must be under positive control. The addition of ammonia, if in the gaseous state, is easily regulated and is preferably used as the controlling means. Furthermore, in order to prevent localized concentration of reagents, the reaction mixture should be vigorously agitated by stirring.

As a means for constantly measuring and observing the pH of the reaction mixture and any change therein, use is made of the well-known antimony electrode or concentration cell which is described on page 235 of the book entitled "Potentiometric Titrations," by Kolthoff and Furman, 2nd edition, John Wiley & Sons (1931). For this purpose one electrode is placed in contact with the reaction mixture and the other is immersed in a glass half-cell containing a buffer solution having the same pH that is desired to be maintained in the reaction mixture. An aqueous solution of 10.5 gm. citric acid and 35.8 gm. $Na_2HPO_4 \cdot 12H_2O$ per liter has a pH of 5.3 and is a suitable buffer solution for my purpose. The buffer solution is connected to the contents of the reaction vessel by a liquid junction formed by a fine fritted porous glass disc sealed into the half-cell, and a sufficient hydrostatic pressure of the buffer solution from the usual reservoir is maintained to prevent diffusion of the reaction mixture into the half-cell. Each electrode is connected to a galvanometer and when the pH of the reaction mixture is the same as that of the buffer solution in the half-cell, a null reading is obtained. The pH may be increased by increasing the rate of introduction of the ammonia and decreased by decreasing the same.

The production of a finely crystalline metastannic acid which settles rapidly and can be filtered easily is subject to the following important consideration: The time required to complete the reaction of any given amount of reagents should be long enough, that is, the rate of mixing of the reagents should be slow enough to provide sufficiently time to permit recrystallization or growth of any colloidal particles which might have formed, as for instance particles formed at the beginning of the reaction before the pH was under proper control. I have found that a total time of reaction of one hour or more is sufficient to produce a proper crystalline product.

The metastannic acid having been precipitated in the manner described above, a quantity of the reaction mixture is drawn off and the precipitate therein is washed several times by decantation with cold water to remove most of the by-product NH₄Cl, the precipitate remaining as a slurry. At this stage, the mineralizer and activating oxide, preferably for example CuO and $Sb_2O_3$, in a finely divided state, may be added to the slurry and thoroughly mixed therewith, the amount of $Sb_2O_3$ being at least twice the amount of CuO. Preferably the CuO should amount to 0.5 to 2 parts by weight per 100 parts of the precipitate calculated to $SnO_2$ and the $Sb_2O_3$ should amount to 1 to 5 parts per 100 parts of $SnO_2$. Somewhat larger amounts may also be used but no advantage is to be gained thereby. If desired, the $Sb_2O_3$ may be introduced by adding to the $SnCl_4$ solution an amount of $SbCl_3$ which is equivalent to the desired amount of $Sb_2O_3$. In the latter case, coprecipitation of the tin and the antimony takes place during the reaction with ammonia.

The precipitated metastannic acid, together with the admixed $Sb_2O_3$ and CuO, are separated from the remaining water by filtration and the mixture is dried and sintered at about 600° C. for about one hour in order to eliminate the residual NH₄Cl before the mixture is calcined at a higher temperature. Failure to eliminate the NH₄Cl before the high temperature calcination may result in the formation and loss of a volatile chloride of antimony.

I have found that in order to bring about the development of the proper crystalline characteristics of the $SnO_2$ which are best for my purpose, the product containing at least 0.5% CuO should be calcined at 1200° to 1400° C. or above. Firing for about 5 minutes at about 1400° C. causes recrystallization and formation of microcrystalline aggregates which have an average diameter greater than ¼ micron. Firing at the lower temperatures for longer times forms microcrystals with little or no tendency to grow.

For the purpose of preparing a slip, the crystalline material resulting from the calcination at 1400° C. may be mixed with finer material from the lower temperature calcination or the high temperature material may be ground in a ball mill to form therein a proportion of fine material. The slip is cast in the usual manner and dried and fired at 1400° C. or above. The mixture of very fine microcrystals with the coarser microcrystals results in a product having better green strength and greater density than would otherwise be the case.

I claim:

In the manufacture of a stannic oxide refractory containing 1 to 5 parts by weight of $Sb_2O_3$ per 100 parts by weight of stannic oxide, the steps which comprise reacting ammonia with stannic chloride and $SbCl_3$ in an aqueous medium at substantially the boiling point of the aqueous reaction mixture, the amount of $SbCl_3$ being equivalent to the indicated proportion of $Sb_2O_3$, maintaining the reaction mixture with agitation at its boiling point for at least one hour after initiation of the reaction, maintaining the pH of the reaction mixture between 4 and 7 during the course of the reaction, and calcining the resulting precipitated mixture at a temperature between 1200 and 1400° C.

JOHN M. MOCHEL.

REFERENCES CITED

The following references are of record in the file of this patent:

UNITED STATES PATENTS

| Number | Name | Date |
| --- | --- | --- |
| 1,529,261 | Lubowsky | Mar. 10, 1925 |
| 1,804,551 | Buttfield | May 12, 1931 |
| 1,830,581 | Weiss | Nov. 3, 1931 |
| 1,879,022 | Barclay | Sept. 27, 1932 |
| 2,401,001 | Jones | May 28, 1946 |

FOREIGN PATENTS

| Number | Country | Date |
| --- | --- | --- |
| 361,402 | Great Britain | Nov. 18, 1931 |
| 364,663 | Great Britain | Jan. 4, 1932 |

OTHER REFERENCES

Smith, Quantitative Analysis, Revised Ed. (1921), The MacMillan Co., N. Y., p. 22.

Ephraim, Inorganic Chemistry, 4th Ed. (Revised), 1943, Nordeman Public Co., N. Y., pp. 819 and 820.